United States Patent
Grandin de l'Eprevier et al.

[11] 3,823,360
[45] July 9, 1974

[54] CONTROL CIRCUIT FOR CHOPPED FEEDING

[75] Inventors: Ludovic Grandin de l'Eprevier, Belfort; Andre Achille Brecy, Danjoutin, both of France

[73] Assignee: Societe Industrielle Honeywell Bull, Paris, France

[22] Filed: Dec. 29, 1972

[21] Appl. No.: 319,825

[52] U.S. Cl............... 321/18, 307/140, 321/43
[51] Int. Cl. ............................................. H02m 7/00
[58] Field of Search .......... 321/18, 43, 47; 307/140

[56] References Cited
UNITED STATES PATENTS

| | | |
|---|---|---|
| 3,418,557 | 12/1968 | Schaffer................................ 321/18 |
| 3,517,301 | 6/1970 | Huber................................ 321/18 X |
| 3,735,241 | 5/1973 | O'Sullivan.............................. 321/47 |

Primary Examiner—William M. Shoop, Jr.
Attorney, Agent, or Firm—Fred Jacob

[57] ABSTRACT

A control circuit is provided for chopped feeding which circuit receives at its inputs an alternating voltage and at its outputs delivers a direct chopped voltage. The choppers are controlled by comparing an error voltage with a sawtooth signal on a fixed frequency generated by a unijunction transistor, whose output is connected to a bistable for channel switching.

6 Claims, 3 Drawing Figures

CONTROL CIRCUIT FOR CHOPPED FEEDING

BACKGROUND OF THE INVENTION

The present invention relates to a control circuit, intended especially, but not exclusively, for chopped power feeding in which the feeding is carried out in two or several channels.

It is the function of chopped feeding to supply the load circuit, which may be for instance a logical circuit, with a direct voltage during a time $t$, in the course of a period T. The voltage $V_S$ obtained at the output of the feeding circuit is given by the formula $V_S = K \cdot E$, wherein K is the form factor defined by the relation $t/T$ (T being the period of the alternating current at the feeding-input terminals and E being the voltage available at the output terminals for feeding when the circuit is closed).

The form factor is generally determined by the closing of a chopper element during the time $t$. This element connects the input and the output terminals of feeding, and is for instance, a transistor. When significant power is to be furnished to the load circuit, the input-output of the feeding is connected, as is known, by two channels such that each transmits the current only during half the time $t$, which prevents prohibitive dissipation in a single channel during the time $t$. There are then, two circuit breakers.

The problem solved by the invention consists in the controlling of each of the circuit breakers during a set time $t/2$, in the course of a period T. Various solutions to this problem have been proposed in the past. One such solution consists of using a determined part of a signal of a variable period as a control signal for the circuit breakers, in other words, one cuts off a fixed portion of a signal whose duration is variable which results in a signal of variable duration. In a known design this subtraction is done by hysteresis in a magnetic core. Unfortunately, this leads to a substantial loss of energy in the core.

One of the objectives therefore, of the present invention is the selection of a switching period based on a circuit with fixed frequency. The operation of the assembly is thus, markedly simplified.

SUMMARY OF THE INVENTION

According to the present invention the control circuit for chopped feeding includes a voltage source to be connected with the output of the feeding through at least one circuit-breaker element. Said circuit receives at its inputs, on the one hand, a negative feedback signal, stemming from the feeding output, and on the other hand, a reference signal. This control circuit is characterized by comprising a sawtooth signal generator of fixed frequency and a comparator circuit for comparing said sawtooth signal and the aforementioned signals which supply pulses of variable duration.

According to another characteristic of the invention, the generator of the sawtooth signal, as mentioned above, includes a conductor and a unijunction transistor. The unijunction transistor partly supplies a sawtooth signal, and partly supplies a pulse for each tooth. Since the circuit breakers are controlled by pulses the number of the magnetic circuits necessary is reduced and the total output is thus increased.

BRIEF DESCRIPTION OF THE DRAWING

Other characteristics and advantages of the invention will evolve in the course of the following description of various forms of embodiment, taken with reference to the accompanying drawing, wherein.

DESCRIPTION OF THE PREFERRED EMBODIMENT

Figure 1:
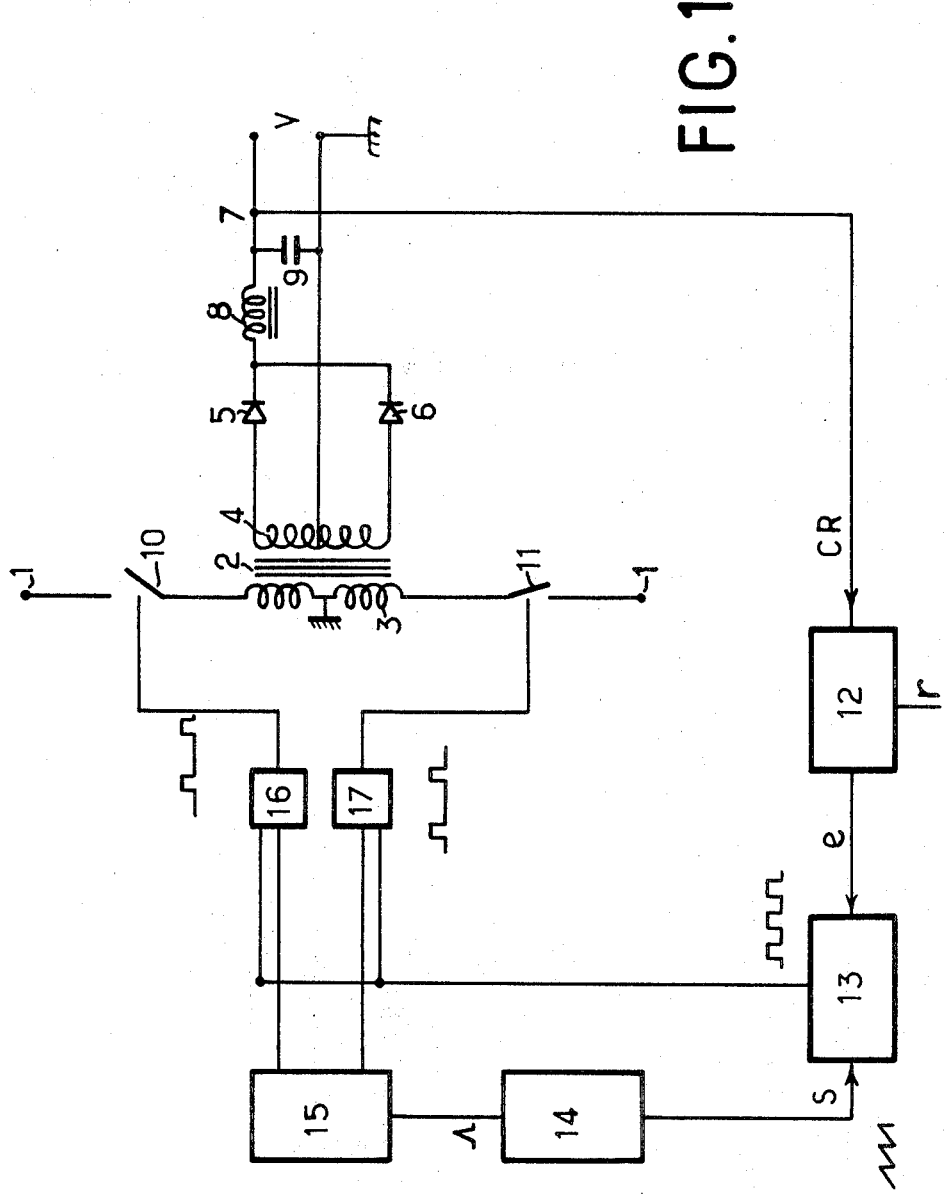
FIG. 1 is a generalized diagram showing a chopped feeding circuit.

The feeding, properly speaking, is represented on the right side of FIG. 1 and includes two terminals 1 to which an alternating voltage Ve is applied. The primary 3 of a transformer 2 is linked to these terminals and the center point of this transformer is connected with the ground potential. The secondary 4, whose center point is also grounded, is tied to an output terminal 7 by means of two rectifiers 5 and 6, and a coil 8 which with the condenser 9 form a filter cell. The desired voltage signal $V_S$ is disposed between the terminal 7 and the ground.

The feeding as such is not part of the invention, and the transformer 2 which was mentioned, although useful, is not indispensible. The invention concerns the control of the choppers 10 and 11 at desired times. For this purpose a negative feedback signal CR is transmitted from the feeding output to one of the inputs of the comparator 12, which supplies at its output an error voltage which is applied to a second linear comparator 13. A sawtooth signal is applied to the second input of the comparator 13 which is generated at 14, and which will be explained below. An output signal of the stage 14 is applied to a bistable 15, each of the two outputs of which is connected with one of the inputs of the two AND gates 16 and 17, while the comparison signal stemming from the comparator 13 is applied to the input.

This circuit operates in the following manner. The comparator 12 simultaneously receives at its inputs the negative feedback signal CR, and the reference signal. The comparator 12 is a differential amplifier that furnishes at its output an error, or control signal $e$. The signal $e$ is compared in the stage 13 with a sawtooth signal.

When the voltage of the sawtooth signal is higher than the voltage of the error signal, the comparator 13 sends a pulse to the input of the gates 16 and 17. The duration of this pulse is determined, on the one hand, by the period and the form of the sawtooth, and on the other hand, by the voltage of the signal $e$. It is then possible by varying this voltage $e$ to select a time $t$, for the closing of one chopper. The choice of one or the other of the choppers 10 and 11 is carried out by means of the pulse appearing at the output of the unijunction transistor during decay of the voltage of the sawtooth signal.

Figure 2:
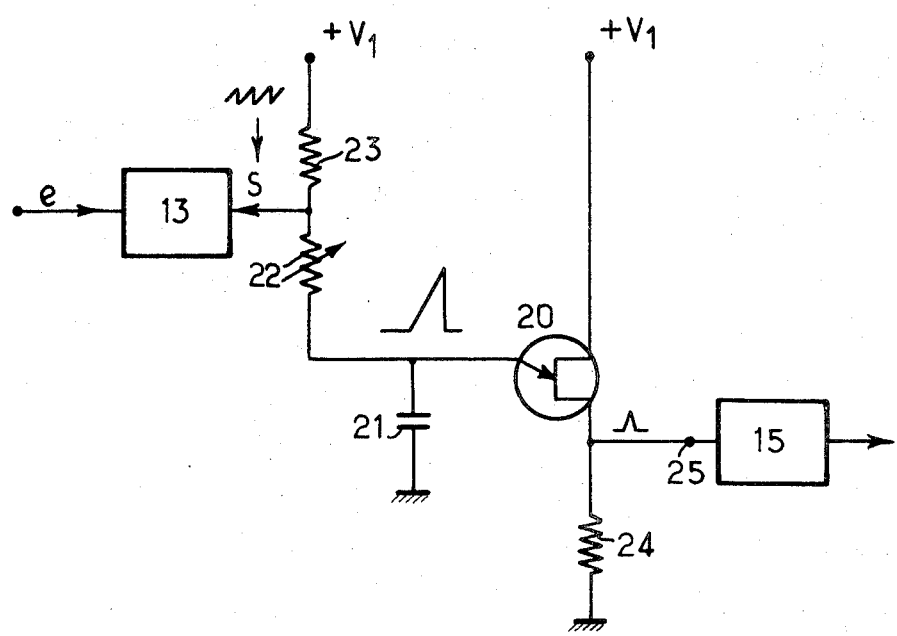
FIG. 2 is a schematic diagram showing the sawtooth oscillator as utilized in the circuit of FIG. 1.

FIG. 2 illustrates the sawtooth signal generator of the stage 14. It consists basically of a unijunction transistor 20, a condensor 21, a potentiometer 22 and a resistor 23. The transistor 20 and the resistor 23 are tied to a feeding source $+V_1$. The resistor 24, connected with the base of the transistor 20, on the one hand, and with the ground, on the other hand, is a bias resistor. When the circuit is placed under voltage the condensor charges according to a law which in a first approximation may be considered linear and which depends on the time constant RC, R being adjustable. By setting the potentiometer 22 one makes sure that the charging time $t_c$ of the condensor 22 is constant. When the voltage at the terminals of the condensor 21 reaches a set value the condensor discharges over the unijunction transistor 20 by furnishing to the base of the latter (the low value of the resistor 24 should be kept in mind) a pulse which is transmitted to the bistable 15.

On the other hand, the desired sawtooth signal S appears at the point common to the resistors 22 and 23 and is applied to one of the inputs of the comparator 13. As mentioned above, the comparison of this signal with the error voltage produces a pulse of variable size.

Figure 3:
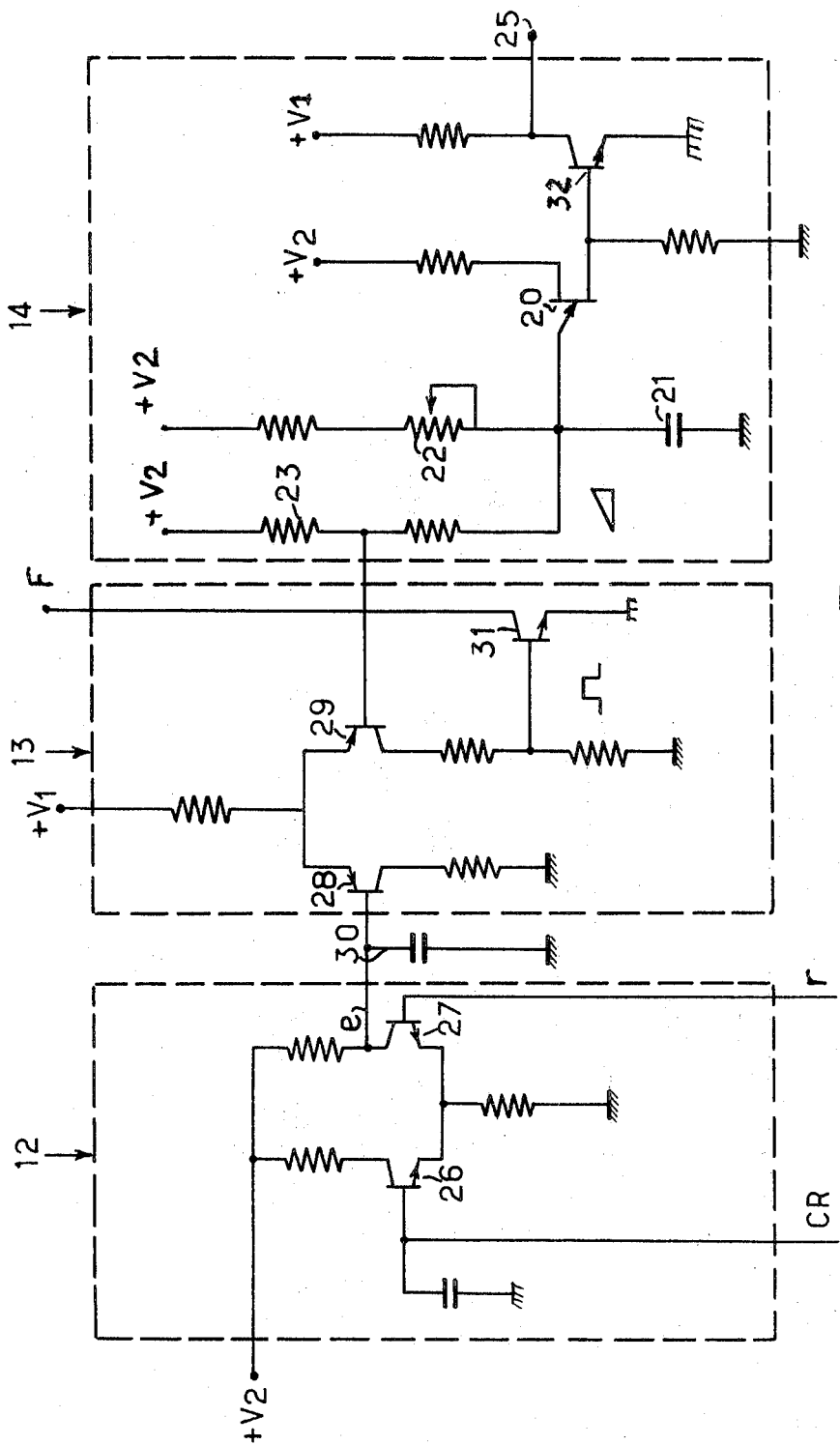
FIG. 3 is a diagram showing a control circuit according to the present invention.

FIG. 3 shows a diagram of a control circuit according to the invention in which the bistable 15 has not been included. However, the reference characters of the elements already mentioned have been retained. The comparator 12 is a differential amplifier consisting of two transistors NPN 26 and 27, to the bases of which the negative feedback signal CR and the reference signal r are respectively applied. The error signal e is taken from the collector of the transistor 26 and applied to the base of the transistor 28. The condensor 30 of weak capacitance is intended to filter the noise that may appear.

The previously mentioned sawtooth signal is applied to the base of the transistor 29 while the error voltage e is applied to the emitter of the same transistor. The transistors 28 and 29 are PNP transistors. When the potential difference between the emitter and the base is suitable, the transistor 29 is conducting and a pulse appears at its collector whose duration is a function of the level relation between the reference voltage and the sawtooth. After amplification, this pulse constitutes the signal of the variable form factor F desired, which is sent off over one or the other channel through the intermediary of the bistable 15 so as to alternatingly form the choppers 10 and 11.

The different elements of stage 14 are presented in detail in FIG. 3. The presence of the bistable 15 is, by the way, only necessary in the case of double alternating feeding. The switching-pulse signal from the base of the unijunction transistor 20 is amplified by the transistor 32 and sent to the terminal 25 of the bistable input.

Thus, the present invention makes it possible to generate at a fixed frequency a signal whose duration and voltage may be modified without affecting the frequency of an oscillator which simplifies the design of the circuits and makes their operation a great deal more easy. The use of a unijunction transistor, on the other hand, which is accomplished in the circuit according to the invention, avoids the application of a large number of active components, and thereby reduces the costs.

What is claimed is:

1. In a chopped feeding system including a voltage source and at least one chopper connected to said voltage source and having an output at which it is desired to produce pulses of selected frequency and of selected time duration, a control circuit for controlling said chopper to produce said pulses and which comprises:

means connected to the output of said feeding system for producing an error signal indicative of deviation of said pulses;

sawtooth generator means for producing sawtooth voltage output which is of said selected frequency; and comparator means connected to said error signal and to said sawtooth voltage output for producing control pulses at said selected frequency and of said selected duration to control said chopper.

2. In a system as defined in claim 1 wherein said sawtooth generator means is a relaxation oscillator including a capacitor and a unijunction transistor for discharging said capacitor and wherein said comparator means comprises a pair of transistors connected in parallel and having respective base electrodes connected respectively to said error signal and to said sawtooth voltage output.

3. In a system as defined in claim 2 wherein said comparator means also includes a transistor having a base electrode connected to that transistor of said pair thereof to whose base electrode said sawtooth voltage output is connected.

4. A circuit according to claim 1 wherein said sawtooth generator means includes a condensor and an unijunction transistor.

5. A circuit according to claim 2, characterized in that the chopped feeding system includes two choppers, the pulse appearing in the output of the unijunction transistor during the discharge said condenser being applied to the input of a bistable element for the selection of one or the other chopper.

6. A circuit according to claim 3, characterized in that the output signal of said comparator means is applied simultaneously to one of the inputs of two AND gates, the second input of each of the two gates being connected with one of the bistable outputs, each of the outputs of said gates being connected with a chopper.

* * * * *